United States Patent
Mie et al.

(10) Patent No.: US 9,215,716 B2
(45) Date of Patent: Dec. 15, 2015

(54) WIRELESS COMMUNICATION APPARATUS AND NON-TRANSITORY COMPUTER READABLE STORAGE MEDIUM

(75) Inventors: Kouki Mie, Fukuoka (JP); Kenji Yamada, Kawasaki (JP); Yuichi Inao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 324 days.

(21) Appl. No.: 13/437,348

(22) Filed: Apr. 2, 2012

(65) Prior Publication Data

US 2012/0188968 A1 Jul. 26, 2012

Related U.S. Application Data

(63) Continuation of application No. PCT/JP2009/067861, filed on Oct. 15, 2009.

(51) Int. Cl.
H04W 72/08 (2009.01)
H04W 40/24 (2009.01)
H04L 12/751 (2013.01)
H04W 84/18 (2009.01)

(52) U.S. Cl.
CPC .......... *H04W 72/08* (2013.01); *H04L 45/026* (2013.01); *H04W 40/24* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,093,129 B1 * | 8/2006 | Gavagni et al. | 713/175 |
| 7,185,197 B2 * | 2/2007 | Wrench, Jr. | 713/168 |
| 7,349,372 B2 * | 3/2008 | Fuke et al. | 370/329 |
| 7,415,548 B2 * | 8/2008 | Mahany et al. | 710/18 |
| 7,483,397 B2 * | 1/2009 | Meier et al. | 370/256 |
| 7,505,450 B2 * | 3/2009 | Castagnoli | 370/350 |
| 7,536,167 B2 * | 5/2009 | Gollnick et al. | 455/343.4 |
| 7,707,403 B2 * | 4/2010 | Yamamoto et al. | 713/156 |
| 7,899,027 B2 * | 3/2011 | Castagnoli et al. | 370/350 |
| 8,300,618 B2 * | 10/2012 | Joshi et al. | 370/348 |

(Continued)

FOREIGN PATENT DOCUMENTS

JP 2002-314600 10/2002
JP 2006-500882 1/2006

(Continued)

OTHER PUBLICATIONS

International Search Report for PCT/J2009/067861 mailed Dec. 15, 2009.

*Primary Examiner* — Gregory Sefcheck
(74) *Attorney, Agent, or Firm* — Staas & Halsey LLP

(57) ABSTRACT

A wireless communication apparatus on the receiving side receives communication data that is a transmitted to the wireless communication apparatus using one of the plurality of channels. Subsequently, the wireless communication apparatus on the receiving side obtains channel information contained in the communication data received by the receiving unit and judges whether the obtained channel information is target information indicating a channel of a processing target. The wireless communication apparatus on the receiving side performs a receiving process on the received communication data, when the judging unit determines that the obtained channel information is the target information, performs a receiving process on the communication data received by the receiving unit and that, when the judging unit determines that the obtained channel information is not the target information, discards the received communication data.

12 Claims, 15 Drawing Sheets

(56) References Cited

U.S. PATENT DOCUMENTS

| | | |
|---|---|---|
| 8,452,008 B2 * | 5/2013 | Dang et al. .................... 380/200 |
| 8,693,308 B2 * | 4/2014 | Hourtane et al. ............. 370/216 |
| 2004/0110508 A1 | 6/2004 | Haartsen |
| 2004/0136347 A1 * | 7/2004 | Fuke et al. .................... 370/338 |
| 2006/0215581 A1 * | 9/2006 | Castagnoli .................... 370/254 |
| 2008/0137556 A1 * | 6/2008 | Park et al. .................... 370/255 |
| 2008/0240160 A1 | 10/2008 | Ishii |
| 2009/0003295 A1 | 1/2009 | Iwao et al. |
| 2010/0039969 A1 * | 2/2010 | Sukenari et al. ............... 370/310 |
| 2013/0229911 A1 * | 9/2013 | Nagata et al. ................. 370/228 |
| 2014/0016645 A1 * | 1/2014 | Nomura et al. ............... 370/392 |

FOREIGN PATENT DOCUMENTS

| | | |
|---|---|---|
| JP | 2006-50371 | 2/2006 |
| WO | WO 2006/068112 A1 | 6/2006 |
| WO | WO 2007/029337 A1 | 3/2007 |

\* cited by examiner

FIG.5

| GD | LD | Hop | d | E |
|---|---|---|---|---|
| GW | LD1 | 2 | 50 | 20 |
|  | LD2 | 3 | 60 | 30 |
|  | LD3 | 3 | 80 | 50 |
| a | LD1 | 2 | 40 | 60 |
|  | LD2 | 2 | 60 | 70 |
|  | LD3 | 3 | 70 | 100 |
| … | … | … | … | … |

| GD | LD | Hop | d | E |
|---|---|---|---|---|
| A | LD1 | 5 | 50 | 20 |
| | LD2 | 6 | 60 | 30 |
| | LD3 | 4 | 80 | 50 |
| B | LD1 | 4 | 40 | 60 |
| | LD2 | 3 | 60 | 70 |
| | LD3 | 5 | 70 | 100 |
| C | LD1 | 20 | 60 | 50 |
| | LD2 | 19 | 70 | 90 |
| | LD3 | 18 | 90 | 100 |
| D | LD1 | 19 | 50 | 30 |
| | LD2 | 17 | 70 | 40 |
| | LD3 | - | - | - |

ROUTING TABLE

| HELLO MESSAGE HEADER | HELLO HEADER (1) | HELLO HEADER (2) | HELLO HEADER (3) | ... | HELLO HEADER |

| GD | Hop | RE-SERVE | d | RETURN PATH LINK WEIGHT |

| AD-HOC HEADER |||||||
|---|---|---|---|---|---|---|
| LOCAL DESTINATION ADDRESS | LOCAL SENDER ADDRESS | GROUP ID | FRAME TYPE | CH NUMBER CHANGE INSTRUCTION | CH NUMBER | FRAME LENGTH |

WIRELESS COMMUNICATION APPARATUS AND NON-TRANSITORY COMPUTER READABLE STORAGE MEDIUM

CROSS-REFERENCE TO RELATED APPLICATION

This application is a continuation of International Application No. PCT/JP2009/067861, filed on Oct. 15, 2009, the entire contents of which are incorporated herein by reference.

FIELD

The embodiments discussed herein are directed to a wireless communication apparatus and a wireless communication computer program.

BACKGROUND

In recent years, ad-hoc networks have been used in which the network is structured by connecting terminals to one another without using any network infrastructure such as access points of a wireless Local Area Network (LAN).

Examples of protocols used in an ad-hoc network include reactive protocols and proactive protocols that are discussed by the Mobile Ad-hoc Networks Working Group (MANET WG) in the Internet Engineering Task Force (IETF). For instance, Ad-hoc On-demand Distance Vector (AODV) is a typical example of the reactive protocols, whereas Optimized Link State Routing (OLSR) is a typical example of the proactive protocols.

In such an ad-hoc network, each of the nodes exchanges messages with other nodes that are positioned adjacent thereto so as to detect whether the adjacent nodes are each active or not and to generate a routing table. Each of the nodes then controls transfer of communication data by using the routing table generated in this manner.

Further, the wireless LAN connecting between the nodes in the ad-hoc network uses one of fourteen channels that are usable in an Industry Science Medical (ISM) band, which is a 2.4 Gigahertz band. For a wireless LAN using a plurality of channels, a technique has been disclosed by which, for example, when communication data is transmitted from a transmission origin to a transmission destination, reliability is improved by using a path formed over a plurality of channels of each node or by transmitting identical pieces of data to two or more paths.

Patent Document 1: Japanese Laid-open Patent Publication No. 2006-50371
Patent Document 2: International Publication No. 2007/029337

According to the technique described above, however, radio wave interference easily occurs because frequency bands of the channels partially overlap. Thus, a problem remains where a situation occurs in which communication interference occurs and it becomes impossible to use the communication service properly.

The problem described above will be more specifically explained, with reference to FIGS. 18 and 19. FIG. 18 is a drawing for explaining a situation in which channels are closed to one another. FIG. 19 is a drawing for explaining a situation in which communication interference is occurring. As depicted in FIG. 18, in an ad-hoc network including a gateway (GW), a node A, a node B, a node C, a node D, a node E, and a node F, the connections are made by three channels such as X (CH14), Y (CH11), and Z (CH5). In this situation, X, Y, and Z denote types of data that are communication targets of the channels, respectively. For example, when the nodes are meter apparatuses, X, Y, and Z correspond to electricity, water, and gas, respectively.

In this situation, even if it is desirable to perform communication by using CH14, because the frequency bands of the channels partially overlap, each of the nodes receives communication in the other channels. For this reason, as depicted in FIG. 19, when mutually different communication services are performed for different channels among mutually the same nodes, communication interference occurs between the channels, and it becomes impossible to use the communication services properly.

SUMMARY

According to an aspect of an embodiment of the invention, a wireless communication apparatus includes a transmitting unit that transmits communication data to a destination node by using one of a plurality of channels; a receiving unit that receives communication data that is transmitted to the wireless communication apparatus using one of the plurality of channels; a judging unit that obtains channel information contained in the communication data received by the receiving unit and judges whether the obtained channel information is target information indicating a channel of a processing target; and a reception controlling unit that, when the judging unit determines that the obtained channel information is the target information, performs a receiving process on the communication data received by the receiving unit and that, when the judging unit determines that the obtained channel information is not the target information, discards the received communication data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is an illustration of an example of a routing table generated by a node Y;

FIG. 7 is an illustration of an example of how a HELLO message is generated;

DESCRIPTION OF EMBODIMENTS

Preferred embodiments of the present invention will be explained with reference to accompanying drawings.

The present invention is not limited to the exemplary embodiments.

[a] First Embodiment

Overall Configuration

Figure 1:
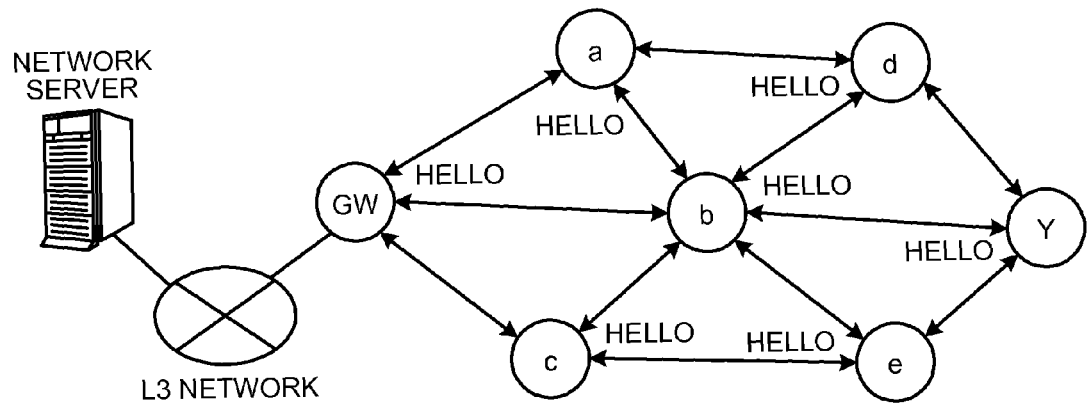
FIG. 1 is an illustration of an overall configuration of an ad-hoc network including wireless communication apparatuses disclosed in the present application.

First, an overall configuration of an ad-hoc network including wireless communication apparatuses disclosed in the present application will be explained, with reference to FIG. 1. FIG. 1 is a drawing of the overall configuration of the ad-hoc network including the wireless communication apparatuses disclosed in the present application. As depicted in FIG. 1, an ad-hoc network including a node a, a node b, a node c, a node d, a node e, and a node Y is connected to a network server in an L3 network via a gateway (GW).

The wireless communication apparatuses disclosed in the present application are represented by the apparatuses corresponding to the nodes and are each configured so as to wirelessly communicate with other nodes, the GW, and the network server, by using an Industry Science Medical (ISM) band, which is a 2.4 Gigahertz band, or the like. Each of the wireless communication apparatuses is, for example, an apparatus that is attached to a meter apparatus for electricity, water, gas, or the like, which is a terminal of which the position is relatively fixed. Each of the nodes is represented by the meter apparatus to which the corresponding one of the wireless communication apparatuses is attached.

Each of the nodes regularly transmits and receives a message (a HELLO message) containing path information and node information such as communication quality information of the links between the nodes (hereinafter, "inter-node links"), to and from the nodes positioned adjacent thereto. Each of the nodes then calculates communication quality of the paths learned from the transmission and the reception of HELLO messages, structures a plurality of paths to a final destination based on the calculation result, and generates a routing table by establishing an optimal path. Further, with regard to the structured paths, each of the nodes recalculates (updates) the communication quality of each of the paths, maintains the paths, learns optimal paths, and occasionally changes the routing table, based on the actual performance of data communication and the transmission and the reception of the HELLO messages to and from the adjacent nodes.

The GW is a network apparatus that connects together a wireless Local Area Network (LAN), which is the ad-hoc network, and the L3 network, which is an external network. For example, the GW has functions of converting a protocol, providing a firewall, and dynamically changing rules of the firewall. Also, by translating addresses and reloading data, the GW connects the nodes, the network server, and the like to one another.

The network server is mutually connected to each of the nodes and is a management apparatus that collects and manages, for example, the status of the ad-hoc network, performance information, communication information, and the like of the nodes. The quantity of nodes, the quantity of ad-hoc networks, the quantity of servers connected to the L3 network that are depicted in FIG. 1 as well as the examples of the wireless communication apparatuses described above are presented only as examples, and the present invention is not limited to these examples. For example, another ad-hoc network or the like may be connected to the L3 network.

An example of structuring the ad-hoc network

Figure 2:
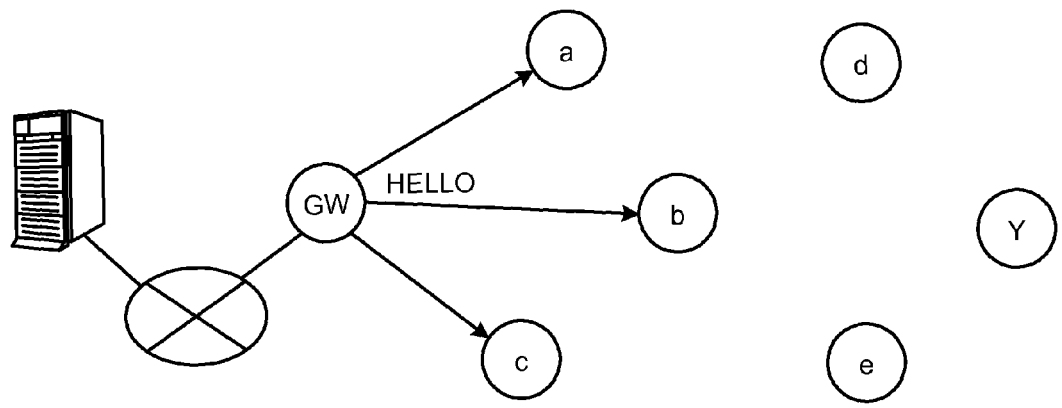
FIG. 2 is an illustration of an example in which a GW transmits a HELLO message to adjacent nodes thereof.

Next, an example in which the ad-hoc network depicted in FIG. 1 is automatically structured through exchanges of HELLO messages by the nodes will be explained, with reference to FIGS. 2 to 7. FIG. 2 is a drawing of an example in which the GW transmits a HELLO message to the adjacent nodes thereof.

As depicted in FIG. 2, when a HELLO transmission time has arrived, the GW transmits, in the manner of a broadcast, a HELLO message containing path information stored in the GW and node information such as communication quality information of the inter-node links. Subsequently, each of the adjacent nodes a, b, and c receives the HELLO message from the GW. At an initial stage of the structuring of the ad-hoc network, the node information transmitted from the GW is blank, because the network is not yet structured.

After that, when having received the HELLO message from the GW, each of the nodes a, b, and c registers the GW into a path information table (a routing table) managed and stored therein. Further, each of the nodes a, b, and c calculates path quality and communication quality of the inter-node links by using the node information that is stored in the GW and is contained in the HELLO message received from the GW, and further registers the calculation result into the routing table and a link table. Each of the nodes a, b, and c does not re-broadcast the HELLO message received from the GW. In other words, each of the nodes a, b, and c does not perform "flooding".

The routing table described above is a table storing therein, as the path information to a destination node, "a hop number (Hop), a path quality weight (d), a return path link weight (E)" and the like. Further, the link table is configured to store therein the information received via the HELLO messages. For example, the link table is a table storing therein a local sender address (LS), link quality information, the number of times a HELLO has been received, a HELLO request interval, and the like.

Figure 3:
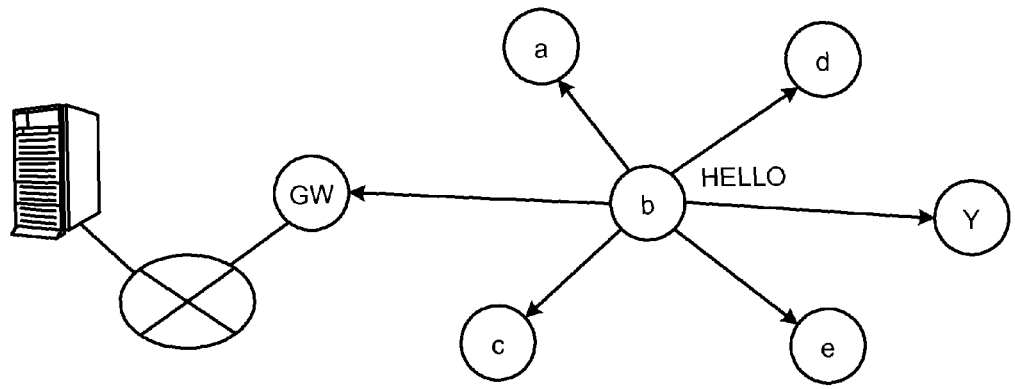
FIG. 3 is an illustration of an example in which a node b transmits a HELLO message to adjacent nodes thereof.

Subsequently, when a HELLO transmission time has arrived, the node b transmits, in the manner of a broadcast, a HELLO message containing the node information stored in the node b, as depicted in FIG. 3. The HELLO message from the node b contains, in addition to the node information of the node b, other node information such as the node information of the GW. Further, the process described above is performed not only by the node b, but also by the nodes a and c each of which received the HELLO message from the GW. FIG. 3 is a drawing of the example in which the node b transmits the HELLO message to the adjacent nodes thereof.

Subsequently, having received the HELLO message from the node b, the node Y registers the node b into a routing table, and also, registers information indicating that the path to the GW is routed through the node b as well as results of calculating the path quality and the link quality thereof into a routing table and a link table. In addition, the process described above is performed not only by the node Y, but also by the nodes a to e and the GW each of which received the HELLO message from the node b. Also, the process is performed by the nodes that received HELLO messages from the nodes a and c, in the same manner.

Further, like the node b, each of the nodes d and e also transmits, in the manner of a broadcast, a HELLO message at a HELLO transmission time of its own. Accordingly, because the node Y receives a HELLO message containing the node information of the GW from each of the nodes b, d, and e, the node Y is able to structure a plurality of paths respectively indicating the node b, d, and e as a next transfer candidate, as paths to the GW.

Figure 4:
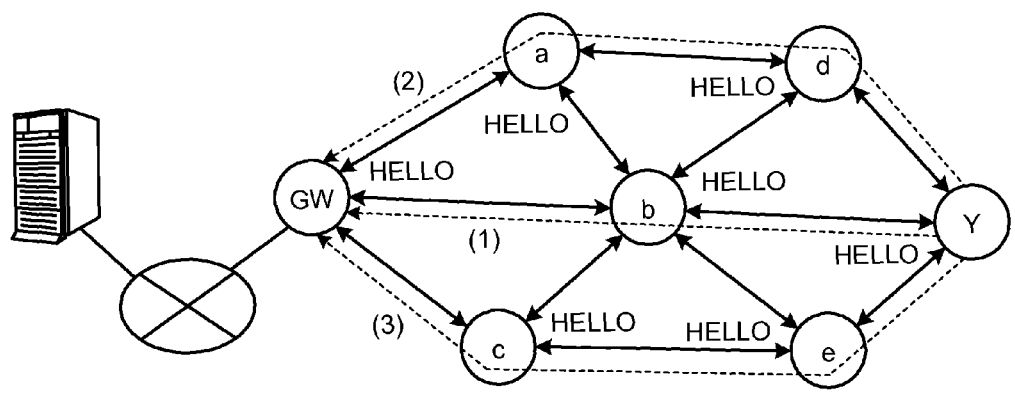
FIG. 4 is an illustration of examples of established paths.

After that, based on the path quality and the link quality information of each of the paths, the node Y establishes a plurality of optimal paths to the GW, which is a final destination. More specifically, as depicted in FIG. 4, the node Y establishes the following three paths as the paths to the GW: (1) the node b—the GW; (2) the node b—the node a—the GW; (3) the node e—the node c—the GW. FIG. 4 is a drawing of the examples of the established paths.

In the manner explained above, each of the nodes generates paths to the destination node in the form of the routing table. Next, an example of the routing table generated by the node Y will be explained, with reference to FIG. 5. FIG. 5 is a drawing of the example of the routing table generated by the node Y. As depicted in FIG. 5, the node Y stores therein, for example, "GW, LD1, 2, 50, 20", "GW, LD2, 3, 60, 30", and "GW, LD3, 3, 80, 50" as values representing "GD, LD, Hop, d, E".

In this situation, the stored information "GD" denotes a global destination address; "LD" denotes a path quantity number identifying a managed path; "Hop" denotes a hop number to the GD; "d" denotes a path quality weight that expresses a delay on the path to the GD by using a numerical value; and "E" denotes a communication quality weight from a corresponding node to the node.

As explained above, each of the nodes generates the routing table by transmitting and receiving the HELLO messages to and from the other nodes, calculating the communication quality of each of the paths, structuring the plurality of paths to the final destination based on the calculation results, and establishing the optimal paths. Further, with regard to the structured paths, each of the nodes re-calculates the communication quality of each of the paths, maintains the paths, learns the optimal paths, and occasionally changes the routing table, based on the actual performance of data communication and the transmission and the reception of the HELLO messages to and from the adjacent nodes.

HELLO Messages

Figure 6:
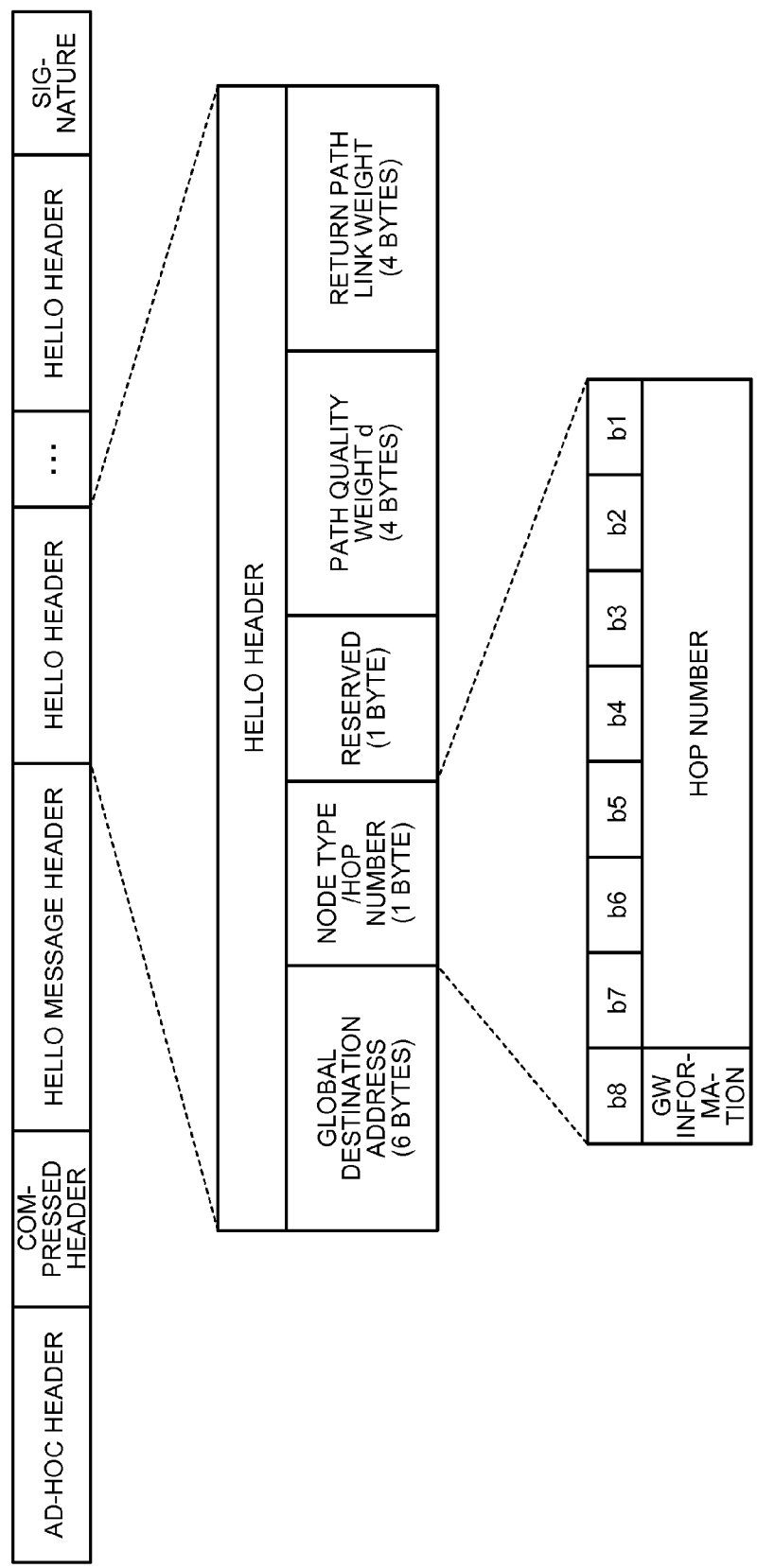
FIG. 6 is an illustration of an exemplary format of a HELLO message.

Next, the HELLO messages transmitted and received among the nodes when the ad-hoc network is structured and the routing tables are generated as described above will be explained, with reference to FIGS. 6 and 7. FIG. 6 is a drawing of an exemplary format of a HELLO message. FIG. 7 is a drawing of an example of how a HELLO message is generated.

Frame Format

First, an exemplary format of a HELLO message will be explained, with reference to FIG. 6. As depicted in FIG. 6, the HELLO message includes an ad-hoc header, a compressed header, a HELLO message header, a plurality of HELLO headers, and a signature.

The ad-hoc header is a header in which information used by a protocol layer (an ad-hoc layer) used in the ad-hoc network is incorporated. The ad-hoc header has a plurality of fields. For example, the ad-hoc header has fields such as "local destination address (LD)" and "local sender address (LS)", which indicate the data transmitting and receiving parties. Further, the ad-hoc header has a "frame type" field indicating the type of the data frame transmitted and received among the nodes and a "frame size" field indicating the size of the frame.

Further, because it is possible to append a plurality of HELLO headers to a HELLO message, each of the nodes has a function of transmitting a HELLO message to an adjacent node thereof after compressing the HELLO message by using a compression algorithm or a function of decompressing a received HELLO message. For example, when a data frame transmitted and received between nodes is a HELLO message, a compressed header in which the information used in the compression/decompression of the frame is incorporated is appended to follow the ad-hoc header. The compressed header has a "compression type" field indicating the compression method of the data portion (the payload) following the compression header and a "frame size" field indicating the size of the frame before the compression. Each of the node apparatuses is able to appropriately decompress the payload while taking the compression type into consideration.

The HELLO message header is a header that has incorporated therein information used when the path information stored in the apparatus and the node information (the HELLO header) such as the communication quality information of the inter-node links are transmitted and received among nodes. For example, the HELLO message header includes a "HELLO header quantity" field indicating the quantity of HELLO headers, an "apparatus ID" field indicating the ID of the node apparatus, and an "access key" field indicating an access key used for decrypting information encrypted in the inter-node link.

Further, the HELLO message is configured to ensure security of the data transmitted and received among the nodes and to prevent "spoofing" of a third party. For example, the HELLO message is configured so that a signature is appended to the data portion (the payload) following the ad-hoc header within the data frame transmitted and received among the nodes and so that the transmission/reception is performed after the payload is encrypted by using a common key.

The HELLO header has a global destination address (GD) field of six bytes, a node type/hop number field of one byte, a reserved field (a reserve field) of one byte, a path quality weight (d) field of four bytes, and a return path link weight (E) field of four bytes.

The global destination address (GD) field is represented by information indicating the final destination node, which is, for example, a Media Access Control (MAC) address of the final destination node. The node type/hop number field includes GW information that is set to 1 when the global destination address indicates the GW and is set to 0 when the global destination address indicates other than the GW, as well as the hop number to the final destination node. The path quality weight (d) represents the delay on the path to the global destination address that is expressed by using a numerical value. The return path link weight (E) represents the communication quality weight from a corresponding node to the node, i.e., quality information indicating the degree by which the HELLO message transmitted from the apparatus is received by the corresponding apparatus.

Generating the Messages

Next, an example of generating the HELLO message will be explained, with reference to FIG. 7. FIG. 7 is illustrated example in which largest hop number for HELLO is 20. In this situation, an example will be explained in which one of the nodes has stored therein the routing table depicted in FIG.

7(a). In the routing table depicted in FIG. 7(a), the global destination nodes (GDs) are "A, B, C, and D" and three paths are stored for each of the GDs. For example, when the GD is "A", "LD1, 5, 50, 20", "LD2, 6, 60, 30", and "LD3, 4, 80, 50" are stored as values representing "LD, Hop, d, E".

When a HELLO message transmission time of the apparatus of its own has arrived, the node storing therein this routing table writes, into HELLO headers, such routes of which the hop number is smaller than a threshold value from among the optimal routes serving as the paths to the GD and transmits, in the manner of a broadcast, the HELLO message to the adjacent nodes thereof. For example, as depicted in FIG. 7, the node writes "LD1", which has the smallest value of "E" among the paths of which the "GD" is indicated as "A", into a HELLO header (see (1) in FIG. 7). Similarly, the node writes "LD1" from among the paths of which the GD is indicated as "B" and also writes "LD1" from among the paths of which the GD is indicated as "C" into HELLO headers (see (2) and (3) in FIG. 7). Further, with regard to "LD1", which has the smallest value of "E" among the paths of which the GD is indicated as "C", because the "Hop" is not smaller than a threshold value "20", the node does not write the "LD1" into any HELLO header. After that, the node transmits, in the manner of a broadcast, the HELLO message generated in this manner to the adjacent nodes thereof.

A Configuration of a Wireless Communication Apparatus

Figure 8:
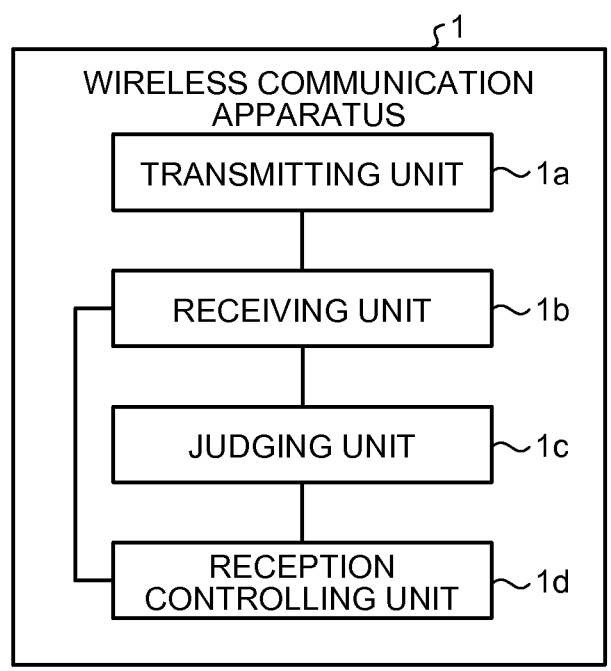
FIG. 8 is a block diagram illustrating of a wireless communication apparatus according to a first embodiment.

Next, a configuration of a wireless communication apparatus according to the first embodiment will be explained, with reference to FIG. 8. FIG. 8 is a block diagram of the wireless communication apparatus according to the first embodiment. A wireless communication apparatus 1 is an apparatus attached to a meter apparatus or the like corresponding to any one of the nodes depicted in FIG. 1 and the like. The wireless communication apparatus 1 includes a transmitting unit 1a, a receiving unit 1b, a judging unit 1c, and a reception controlling unit 1d.

The transmitting unit 1a transmits communication data to a destination node by using one of a plurality of channels. For example, the transmitting unit 1a appends a channel number to be used by the communication data to the ad-hoc header within the ad-hoc message frame representing the communication data of an application or the like and transmits the communication data to the destination.

The receiving unit 1b receives communication data that is addressed to the node of its own and has been transmitted by using one of the plurality of channels. For example, the receiving unit 1b receives communication data addressed to the apparatus from another node and outputs the received communication data to the judging unit 1c.

The judging unit 1c obtains channel information contained in the communication data received by the receiving unit 1b and judges whether the obtained channel information is channel information of a communication target. For example, the judging unit 1c judges whether the channel number contained in the ad-hoc header within the ad-hoc message frame representing the received communication data is the channel number that is currently designated as a communication target by the wireless communication apparatus 1 and outputs the judgment result to the reception controlling unit 1d.

When the judging unit 1c has determined that the channel information is the channel information of the communication target, the reception controlling unit 1d performs a receiving process on the communication data received by the receiving unit 1b. On the contrary, when the judging unit 1c has determined that the channel information is not the channel information of the communication target, the reception controlling unit 1d discards the communication data received by the receiving unit 1b.

As explained above, according to the first embodiment, the wireless communication apparatus on the transmitting side of the communication data appends the channel number to be used by the communication data being the transmission target and transmits the communication data to the destination (on the receiving side). The wireless communication apparatus on the receiving side receives the communication data only when the channel number contained in the received communication data is the channel number that is currently designated as the target. As a result, the wireless communication apparatus on the receiving side is able to receive only communication data transmitted with the proper channel number. In other words, even if communication interference has occurred in the network, the wireless communication apparatus on the receiving side is able to judge whether the data is reception target data based on the channel number contained in the communication data. Consequently, even in the ad-hoc network environment where a plurality of channels are usable, it is possible to use the communication service properly.

[b] Second Embodiment

The wireless communication apparatuses disclosed in the present application may include other various controlling units besides the controlling unit described in the first embodiment. In a second embodiment, a wireless communication apparatus including other various controlling units besides the controlling unit described in the first embodiment will be explained, with reference to FIGS. 9 to 11.

Another Configuration of the Wireless Communication Apparatus

Figure 9:
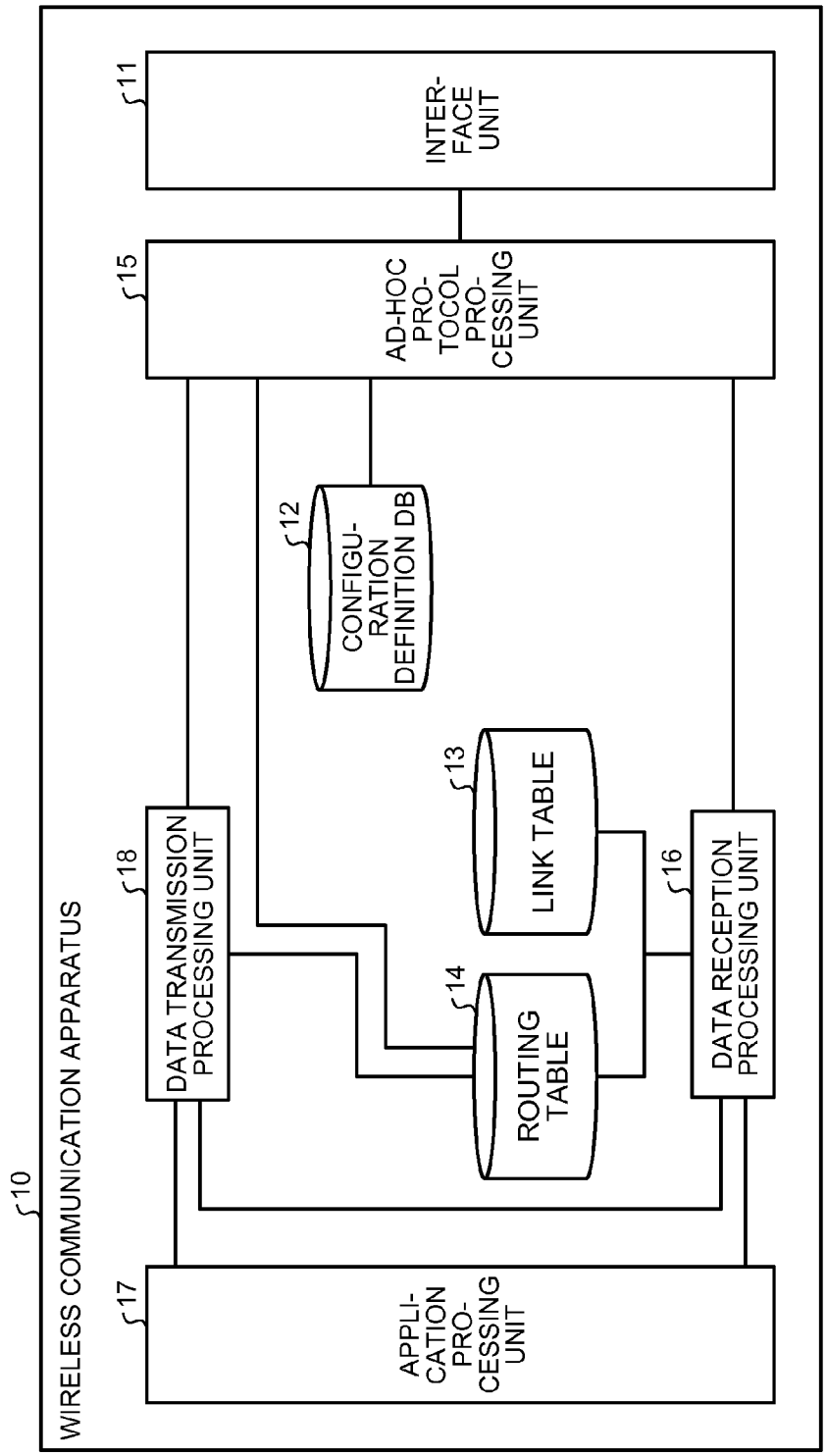
FIG. 9 is a block diagram illustrating of a wireless communication apparatus according to a second embodiment.

First, a configuration of the wireless communication apparatus according to the second embodiment will be explained, with reference to FIG. 9. FIG. 9 is a block diagram of the wireless communication apparatus according to the second embodiment. As depicted in FIG. 9, a wireless communication apparatus 10 includes an interface unit 11, a configuration definition database (DB) 12, a link table 13, a routing table 14, and an ad-hoc protocol processing unit 15. The wireless communication apparatus 10 further includes a data reception processing unit 16, an application processing unit 17, and a data transmission processing unit 18.

For example, the configuration definition DB 12, the link table 13, and the routing table 14 are each configured with a semiconductor memory element or a storage device such as a hard disk. The ad-hoc protocol processing unit 15, the data reception processing unit 16, the application processing unit 17, the data transmission processing unit 18 are each configured with an integrated circuit, an electronic circuit, or the like.

The interface unit 11 is a wireless communication interface that performs wireless communication with other wireless communication apparatuses and a GW. For example, the interface unit 11 receives a HELLO message or regular communication data from other nodes positioned adjacent thereto and outputs what has been received to the ad-hoc protocol processing unit 15. Also, the interface unit 11 transmits a HELLO message received from the ad-hoc protocol processing unit 15 to the adjacent nodes thereof in the manner of a broadcast and transmits communication data received from the ad-hoc protocol processing unit 15 to a destination node.

The configuration definition DB 12 is a storage unit storing therein configuration information such as a communication status of the wireless communication apparatus 10. For example, the configuration definition DB 12 stores therein a channel number to be used for communication data in correspondence with the type of the communication data and stores therein a wireless transmission signal output level value at a current location point or the like.

The link table 13 is a storage unit storing therein information extracted by the data reception processing unit 16 out of the received HELLO message. For example, the link table 13 stores therein a "local sender address (LS)", "link quality information", "the number of times a HELLO has been received", a "HELLO request interval", an "access key", and the like.

The "local sender address (LS)" is address information of the transmission origin node of the received HELLO message. The "link quality information" denotes the "path quality weight (d)" contained in the received HELLO message. Further, "the number of times a HELLO has been received" denotes the number of times a HELLO message has been received in the communication with the LS. The "HELLO request interval" denotes the interval with which transmission and reception are performed with the LS. The "access key" denotes an encryption key used for decoding the encryption of a data frame that is transmitted from the transmission origin node and of which the frame type is other than a HELLO message.

The routing table 14 is a storage unit storing therein the routing information to destination nodes. More specifically, from among the plurality of paths to each of the destination nodes, the routing table 14 stores therein a predetermined number of paths as optimal paths, for example, in an ascending order of the communication quality weights "E", i.e., in the descending order of the communication quality levels.

For example, as depicted in FIG. 5, the routing table 14 stores therein routing information such as "GW, LD1, 2, 50, 20", "GW, LD2, 3, 60, 30", "GW, LD3, 3, 80, 50" as values representing "GD, LD, Hop, d, E".

In this situation, the stored information "GD" denotes a global destination address; "LD" denotes a path quantity number identifying a managed path. "Hop" denotes a hop number to the GD; "d" denotes a path quality weight that expresses the delay on the path to the GD by using a numerical value; and "E" denotes a communication quality weight from a corresponding node to the node of its own.

The ad-hoc protocol processing unit 15 appends an ad-hoc header to each piece of data transmitted from the data transmission processing unit 18 and transmits the data to the destination and outputs data received by the interface unit 11 to the data reception processing unit 16. For example, when a HELLO message is input to the ad-hoc protocol processing unit 15 from the data transmission processing unit 18, the ad-hoc protocol processing unit 15 appends an ad-hoc header to the HELLO message and transmits the HELLO message to the adjacent nodes thereof (other wireless communication apparatuses) in the manner of a broadcast.

Further, when data such as an application is input to the ad-hoc protocol processing unit 15 from the data transmission processing unit 18, the ad-hoc protocol processing unit 15 refers to the configuration definition DB 12 and obtains the channel number of the communication target to be used by the data type. Subsequently, the ad-hoc protocol processing unit 15 appends an ad-hoc header to the input data, the ad-hoc header containing the channel number obtained out of the configuration definition DB 12, and transmits the input data to the destination node according to the routing information stored in the routing table 14.

Further, the ad-hoc protocol processing unit 15 judges whether the data received by the interface unit 11 is a HELLO message as described above or communication data to be processed by an application or the like. Further, when the received data is a HELLO message, the ad-hoc protocol processing unit 15 transfers the HELLO message to the data reception processing unit 16.

On the contrary, when the received data is communication data, the ad-hoc protocol processing unit 15 obtains the channel information contained in the communication data and judges whether the obtained channel information is the channel information of the communication target. More specifically, the ad-hoc protocol processing unit 15 obtains the type of the communication data and the channel number out of the ad-hoc header or the like of the received communication data. Further, the ad-hoc protocol processing unit 15 judges whether the obtained set made up of the type of the communication data and the channel number is stored in the configuration definition DB 12, i.e., whether the received communication data is data transmitted with the channel number of the communication target.

After that, when the channel information is determined to be the channel information of the communication target, i.e., when the data is determined to be data transmitted with the proper channel number, the ad-hoc protocol processing unit 15 outputs the communication data to the data reception processing unit 16. On the contrary, when the channel information is determined to be not the channel number of the communication target, i.e., when the data is determined to be not data transmitted with the proper channel number, the ad-hoc protocol processing unit 15 discards the received communication data.

The data reception processing unit 16 performs various types of receiving processes on the data output from the ad-hoc protocol processing unit 15. For example, when the data output from the ad-hoc protocol processing unit 15 is communication data, the data reception processing unit 16 outputs the received communication data to the application processing unit 17, which executes an application or the like that uses the communication data as a processing target.

On the contrary, when the data output from the ad-hoc protocol processing unit 15 is a HELLO message, the data reception processing unit 16 generates and/or updates the link table 13 and the routing table 14. More specifically, the data reception processing unit 16 judges whether the received HELLO message was transmitted from a new transmission origin node, by referring to the "local sender address (LS)" in the link table 13. Further, when the HELLO message was transmitted from a new transmission origin node, the data reception processing unit 16 generates a new table in the link table 13. In other words, the data reception processing unit 16 extracts or generates "the LS, the link quality information, the number of times a HELLO has been received, the HELLO request interval, and the access key" from the HELLO message and stores the information into the link table 13.

On the contrary, when the HELLO message was not transmitted from a new transmission origin node, i.e., the HELLO message was transmitted from an existing node, the data reception processing unit 16 updates the link table 13. In other words, the data reception processing unit 16 obtains "the LS, the link quality information, the number of times a HELLO has been received, the HELLO request interval, and the access key" from the received HELLO message and updates the table of the corresponding "LS".

Further, when the link table 13 is updated or a new table is generated as described above, the data reception processing unit 16 generates routing information containing "GD, LD, Hop, d, E" from the information stored in the link table 13 and stores the generated routing information into the routing table 14.

The application processing unit 17 executes computer programs and applications and transmits generated data and the like to other nodes and other networks. For example, the application processing unit 17 outputs data generated through an application process or the like that is executed by using an upper protocol layer such as an application layer or a presentation layer, to the data transmission processing unit 18. Further, when having received communication data from the data reception processing unit 16, the application processing unit 17 executes an application or the like that processes the communication data and transmits the new data generated from the execution result to a destination or stores the execution result into a storage unit or the like (not depicted).

When a HELLO message time has arrived, the data transmission processing unit 18 generates a HELLO message and outputs the generated HELLO message to the ad-hoc protocol processing unit 15. For example, of the ad-hoc header, the compressed header, the HELLO message header, the plurality of HELLO headers, and the signature contained in a HELLO message, the data transmission processing unit 18 stores the node information stored in the apparatus into the HELLO headers. More specifically, as explained with reference to FIG. 7, the data transmission processing unit 18 stores optimal path information corresponding to each of the global destination nodes (GDs) stored in the routing table 14 into each of the plurality of HELLO headers. Further, the data transmission processing unit 18 generates a HELLO message containing the HELLO header to which the node information is appended for each of the global destination nodes (GDs) and outputs the generated HELLO message to the ad-hoc protocol processing unit 15.

In contrast, when having received communication data from the application processing unit 17, the data transmission processing unit 18 outputs an ad-hoc frame data transmission request requesting that an ad-hoc header is to be appended, to the ad-hoc protocol processing unit 15, together with the communication data.

The Process Performed by the Ad-Hoc Protocol Processing Unit

Figure 10:
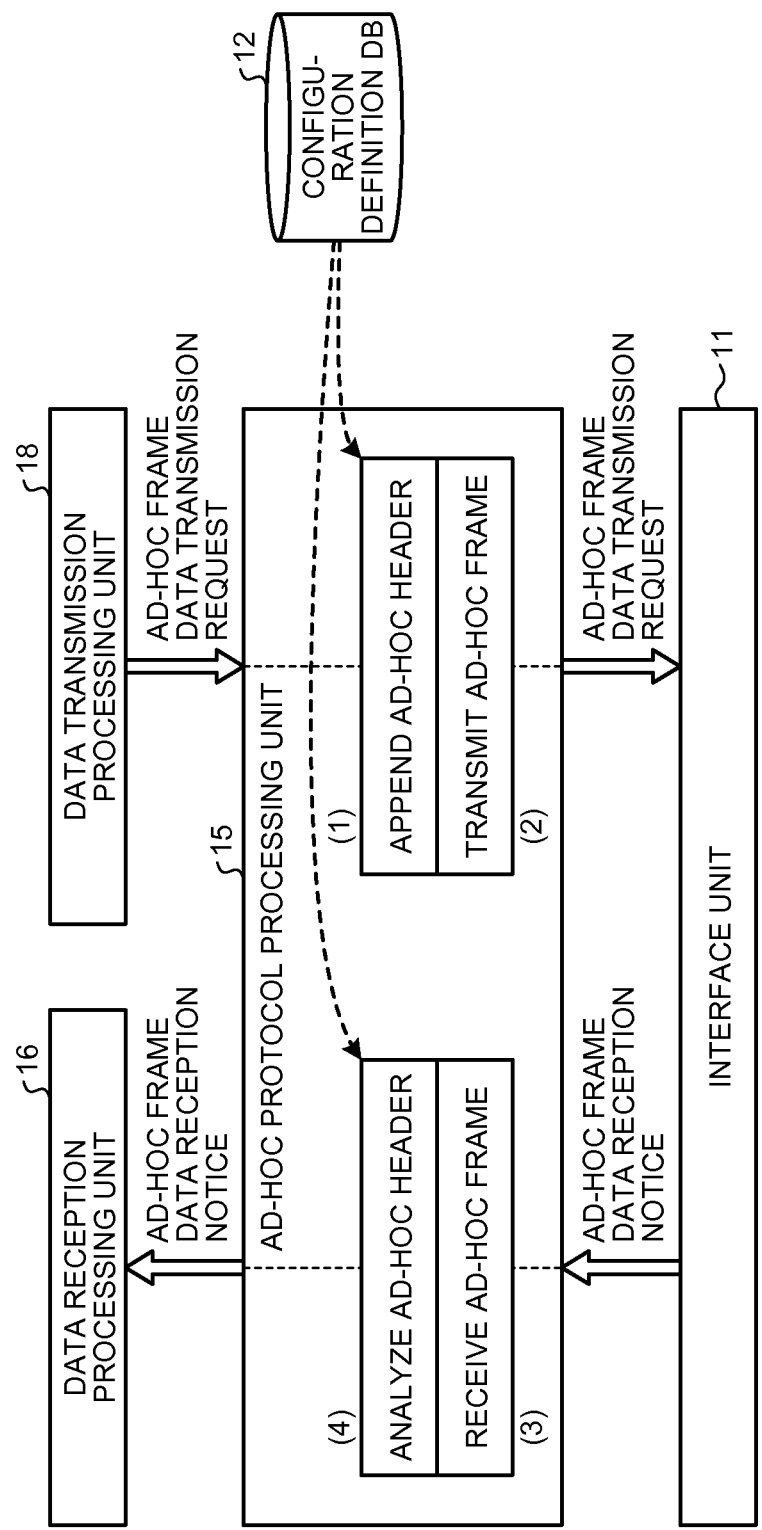
FIG. 10 is an illustration of a detailed configuration of an ad-hoc protocol processing unit.
Figure 11:
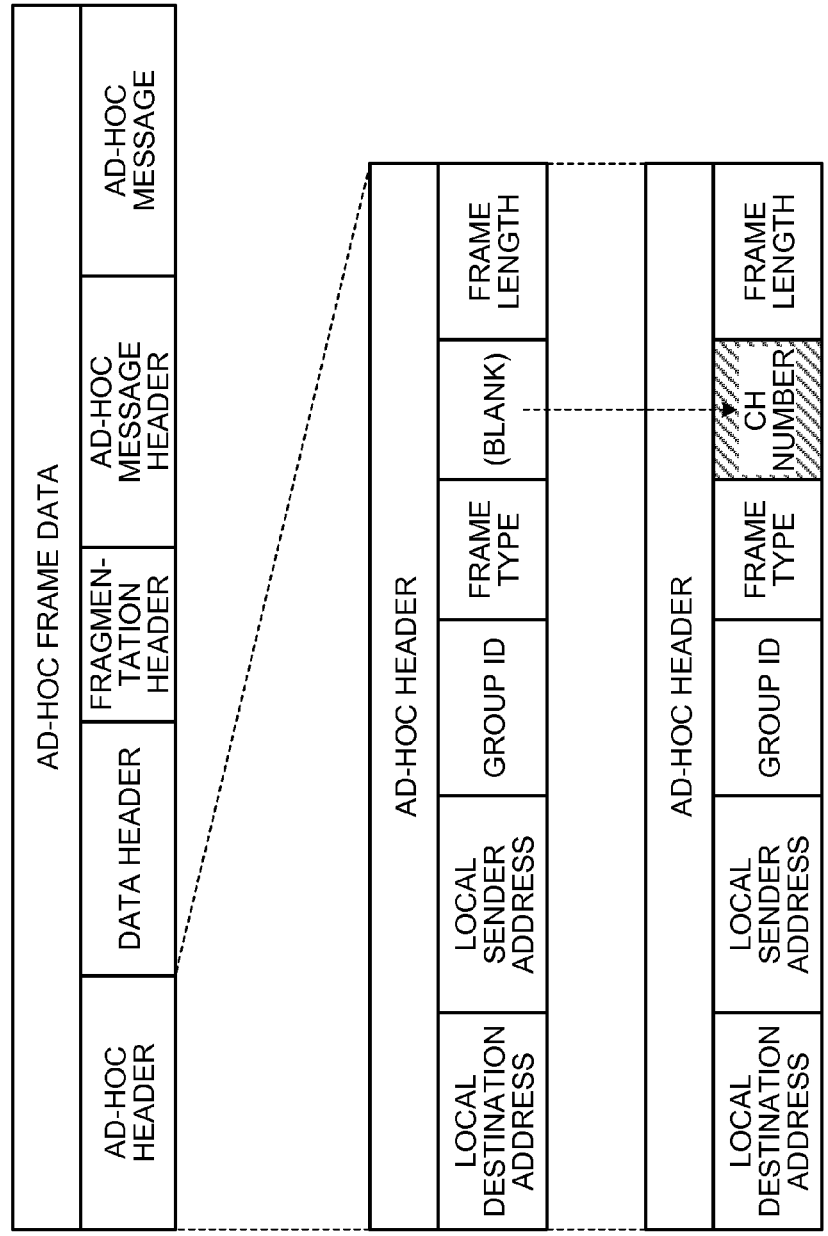
FIG. 11 is an illustration of an exemplary format of ad-hoc frame data.

Next, the process performed by the ad-hoc protocol processing unit 15 described with reference to FIG. 9 will be more specifically explained, with reference to FIGS. 10 and 11. FIG. 10 is a drawing of a detailed configuration of the ad-hoc protocol processing unit. FIG. 11 is a drawing of an exemplary format of the ad-hoc frame data.

As depicted in FIG. 10, when having received an ad-hoc frame data transmission request from the data transmission processing unit 18, the ad-hoc protocol processing unit 15 generates ad-hoc frame data by appending an ad-hoc header to the received data (see (1) in FIG. 10). In this situation, the ad-hoc protocol processing unit 15 obtains the channel number to be used by the communication data (the ad-hoc frame data) that is contained in the received request out of the configuration definition DB 12 and appends the obtained channel number to the ad-hoc header.

More specifically, as depicted in FIG. 11, the ad-hoc protocol processing unit 15 appends the channel number (CH number) into a "blank" field of the ad-hoc header including "a local destination address, a local sender address, a group ID, a frame type, the blank, and a frame length". The "local destination address" is information such as a Media Access Control (MAC) address that identifies the destination node of the ad-hoc frame data. The "local sender address" is information such as a MAC address that identifies the transmission origin node i.e., the apparatus itself.

The "group ID" is identifier information used for dividing the nodes structuring the ad-hoc network into groups in correspondence with areas such as cities, towns, and villages. The "group ID" is used for the purpose of, for example, exercising grouping control on the ad-hoc network so that only such nodes that have mutually the same "group ID" are able to communicate with one another. Further, the frame type denotes the type of the ad-hoc message frame being the transmission target. For example, the frame type indicates the data type of the payload portion following the ad-hoc header, e.g., the frame type "1" indicates a HELLO message, whereas the frame type "2" indicates communication data. Further, the "frame length" denotes the length of the ad-hoc frame data being the transmission target.

Further, the ad-hoc protocol processing unit 15 generates ad-hoc frame data by appending an ad-hoc header to the data received from the data transmission processing unit 18 and transmits the generated ad-hoc frame data to the destination node via the interface unit 11 (see (2) in FIG. 10).

Also, when ad-hoc frame data has been received by the interface unit 11, the ad-hoc protocol processing unit 15 receives the ad-hoc frame data together with a reception notice from the interface unit 11 (see (3) in FIG. 10). After that, the ad-hoc protocol processing unit 15 obtains the channel number out of the ad-hoc header in the received data. Subsequently, the ad-hoc protocol processing unit 15 outputs the data to the data reception processing unit 16 if the obtained channel number is the channel number of the communication target and discards the data if the obtained channel number is not the channel number of the communication target (see (4) of FIG. 10).

More specifically, the ad-hoc protocol processing unit 15 obtains the channel number out of the ad-hoc header in the received data, and also, determines the type of the data based on the ad-hoc header in the data or the like. Subsequently, the ad-hoc protocol processing unit 15 obtains the channel number corresponding to the type of the received data from the configuration definition DB 12 and judges whether the channel number obtained out of the configuration definition DB 12 matches the channel number obtained directly out of the data. Further, if the channel numbers match each other, the ad-hoc protocol processing unit 15 determines that the channel number is the channel number of the communication target and outputs the data to the data reception processing unit 16. On the contrary, if the channel numbers do not match each other, the ad-hoc protocol processing unit 15 determines that the channel number is not the channel number of the communication target and discards the data.

Flows in the Processes Performed by the Wireless Communication Apparatuses

Figure 12:
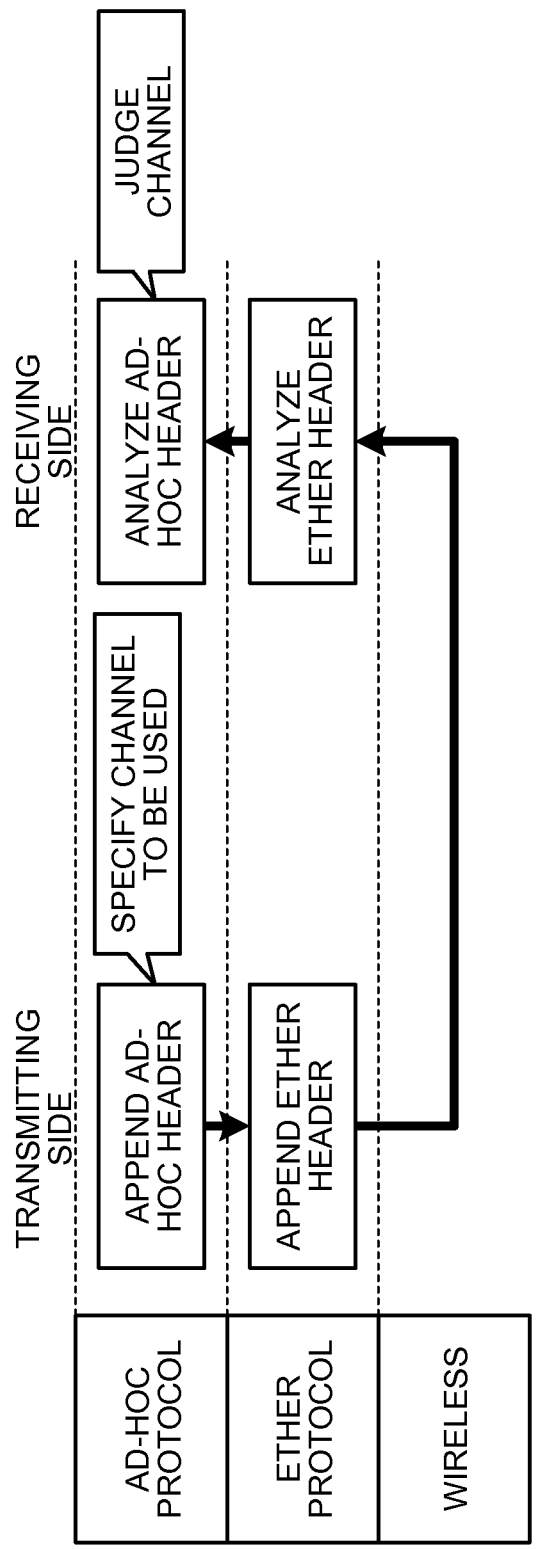
FIG. 12 is a schematic illustration of flows in processes performed by the wireless communication apparatuses according to the second embodiment.
Figure 13:
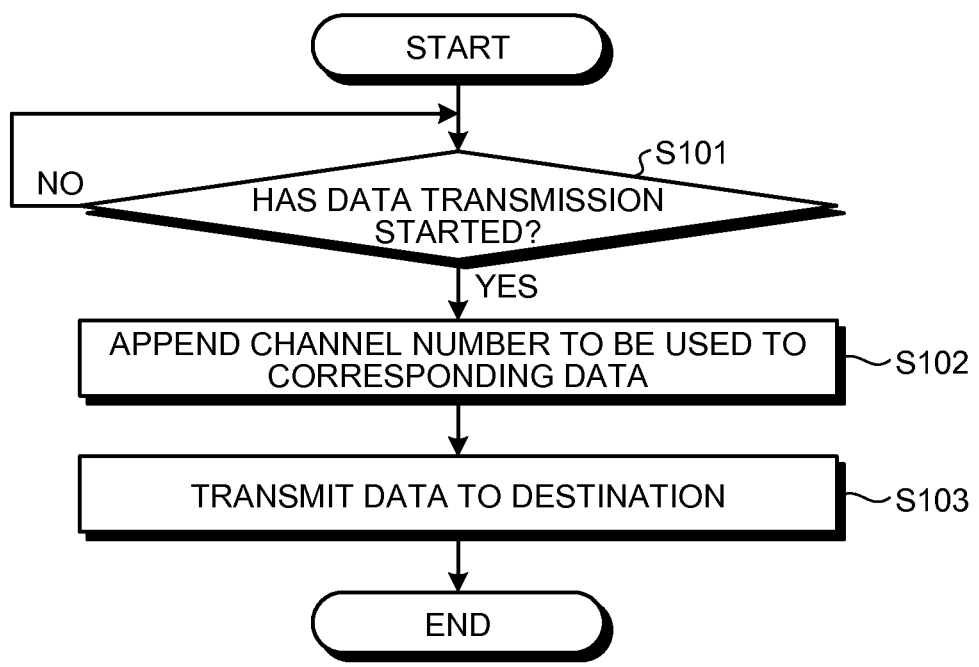
FIG. 13 is a flowchart of a flow in a data transmitting process performed by the wireless communication apparatus according to the second embodiment.
Figure 14:
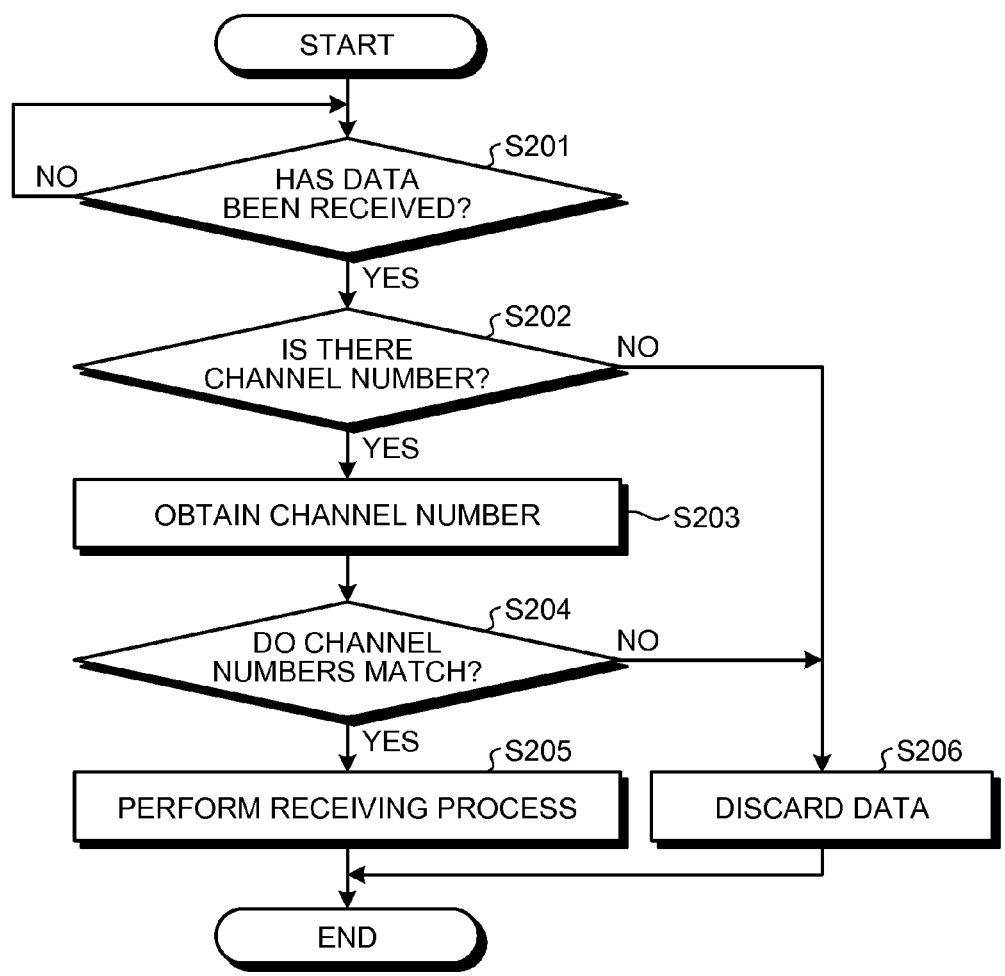
FIG. 14 is a flowchart of a flow in a data receiving process performed by the wireless communication apparatus according to the second embodiment.

Next, flows in the processes performed by the wireless communication apparatuses according to the second embodiment will be explained, with reference to FIGS. 12 to 14. FIG. 12 is a schematic drawing of the flows in the processes performed by the wireless communication apparatuses according to the second embodiment. FIG. 13 is a flowchart of a flow in a data transmitting process performed by the wireless communication apparatus according to the second embodiment. FIG. 14 is a flowchart of a flow in a data receiving process performed by the wireless communication apparatus according to the second embodiment.

An Overview of the Flows in the Processes

First, an overview of the flows in the processes performed by the wireless communication apparatuses will be explained. As described in FIG. 12, in the wireless communication apparatus 10 on the data transmitting side, the ad-hoc protocol processing unit 15 appends the channel to be used to the ad-hoc header processed by an ad-hoc protocol, within the ad-hoc frame data being the transmission target. Further, in the wireless communication apparatus 10 on the data transmitting side, the interface unit 11 appends an Ether header processed by an Ether protocol to the ad-hoc frame data being the transmission target, so that the ad-hoc frame data is transmitted to the destination by wireless communication.

In the wireless communication apparatus 10 on the data receiving side, when the interface unit 11 receives ad-hoc frame data, it is judged whether the ad-hoc frame data is addressed to the wireless communication apparatus 10 itself based on the Ether header or the like in the received data so that only such data that is addressed to the wireless communication apparatus 10 itself is received. Further, in the wireless communication apparatus 10 on the data receiving side, the ad-hoc protocol processing unit 15 obtains the channel number out of the ad-hoc header in the received ad-hoc frame data and judges whether the channel number is the channel number of the communication target. Further, in the wireless communication apparatus 10 on the data receiving side, if the ad-hoc protocol processing unit 15 has determined that the channel number in the received data is the channel number of the communication target, the ad-hoc protocol processing unit 15 outputs the data to the data reception processing unit 16. On the contrary, if the ad-hoc protocol processing unit 15 in the wireless communication apparatus 10 on the data receiving side has determined that the channel number in the received data is not the channel number of the communication target, the ad-hoc protocol processing unit 15 discards the data.

A Flow in the Data Transmitting Process

Next, a flow in a data transmitting process performed by the wireless communication apparatus according to the second embodiment will be explained. As described in FIG. 13, when having received the start of a data transmission from the data transmission processing unit 18 (step S101: Yes), the ad-hoc protocol processing unit 15 in the wireless communication apparatus 10 obtains the channel number to be used for the ad-hoc frame data being the transmission target, out of the configuration definition DB 12.

Further, the ad-hoc protocol processing unit 15 generates data by appending the channel number to the ad-hoc header of the ad-hoc frame data being the transmission target (step S102). Subsequently, the ad-hoc protocol processing unit 15 transmits the generated data to the destination, according to the routing information stored in the routing table 14 (step S103).

A Flow in a Data Receiving Process

Next, a flow in a data receiving process performed by the wireless communication apparatus according to the second embodiment will be explained. As described in FIG. 14, the interface unit 11 in the wireless communication apparatus 10 receives ad-hoc frame data addressed to the wireless communication apparatus 10 itself (step S201: Yes). After that, the ad-hoc protocol processing unit 15 judges whether a channel number is appended to the ad-hoc header in the received ad-hoc frame data (step S202).

If a channel number is appended (step S202: Yes), the ad-hoc protocol processing unit 15 obtains the channel number out of the ad-hoc header (step S203) and judges whether the obtained channel number matches the channel number of the communication target (step S204). Subsequently, if the channel number obtained out of the ad-hoc header matches the channel number of the communication target (step S204: Yes), the ad-hoc protocol processing unit 15 outputs the data to the data reception processing unit 16 (step S205). After that, receiving processes are performed by the data reception processing unit 16 and the application processing unit 17.

On the contrary, when no channel number is appended (step S202: No) or when the channel number does not match the channel number of the communication target (step S204: No), the ad-hoc protocol processing unit 15 discards the received data (step S206).

An Advantageous Effect of the Second Embodiment

As explained above, according to the second embodiment, in the ad-hoc network in which the communication is performed by using the plurality of channels at the same time, even if a communication interference state is caused by a radio wave interference, the wireless communication apparatuses are able to properly use the communication and the services for each of the channels.

[c] Third Embodiment

In the first embodiment, the example is explained in which the channel number is appended to the ad-hoc header so that it is possible to use the services properly even in a communication interference environment; however, in other examples, it is possible to change the channel number being used by using an ad-hoc header. In a third embodiment, an example will be explained in which the channel number being used is changed by using an ad-hoc header in ad-hoc frame data, with reference to FIGS. 15 and 16.

Figures 15, 16:
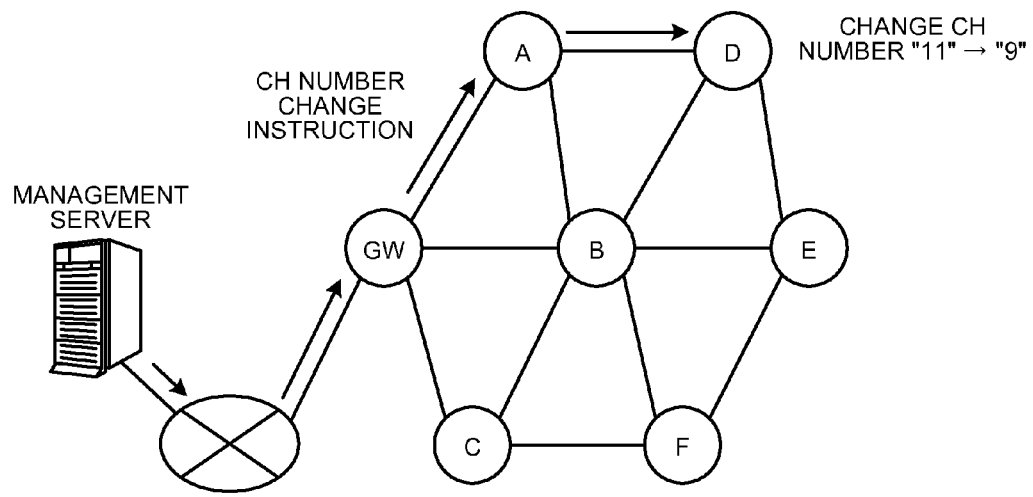
FIG. 15 is an illustration of an example of an ad-hoc header used when a channel number is to be changed.
FIG. 16 is an illustration of an exemplary data flow used when a channel number is changed.

FIG. 15 is a drawing of an example of an ad-hoc header used when a channel number is to be changed. FIG. 16 is a drawing of an exemplary data flow used when a channel number is changed. More specifically, a management server or the like that manages channel numbers and that obtains and manages various types of information from the nodes expands an ad-hoc header by, as depicted in FIG. 15, appending a post-change channel number (CH number) and a change instruction (CH number change instruction) thereto and transmits the data to a destination.

For example, when transmitting an instruction indicating that the channel number of a node D is to be changed from "11" to "09", the management server generates an ad-hoc header in which "1 (or 0 when making no change)" is appended as a "CH number change instruction" and "9" is appended as a "CH number". Further, as depicted in FIG. 16, the management server transmits ad-hoc frame data containing the generated ad-hoc header to the node D via "GW— node A", according to the routing information. Because the "CH number change instruction" in the ad-hoc header within the received ad-hoc frame data is "1", the node D changes the channel number to "CH number=9" as indicated in the ad-hoc header.

As explained here, it is possible to change the channel number by using the ad-hoc frame data, without the need to take the trouble of going into the individual node to change the settings. For example, let us imagine a situation where a failure has occurred in a node represented by a water meter, which structures the most important life line, due to a natural disaster or the like, and where it is impossible to have the water supply due to the failure of the node. In that situation, when converting the use of a gas meter node, which works properly, and attaching the gas meter node to the water meter node, it is possible to change the channel number by using the method described above and to resume the use of the water meter and the water supply.

[d] Fourth Embodiment

Some exemplary embodiments of the present invention have thus been explained; however, it is possible to implement the present invention in various different modes other than the exemplary embodiments described above. In the following sections, other exemplary embodiments will be explained.

Changing the Channel Number

For instance, in the third embodiment, the example in which the management apparatus changes the channel number of the node is explained; however, the present invention is not limited to this example. A node is able to change the channel number of another node by using the same method.

Channel Information

For instance, in the first to the third embodiments, the example in which the channel numbers are used as the channel information is explained; however, the present invention is not limited to this example. For example, it is possible to use any other information that identifies each of the channels, such as reference numbers uniquely assigned.

Configurations of the Wireless Communication Apparatuses

For instance, in the first to the third embodiments, the wireless communication apparatuses explained each have the reception control to receive only such data to which the channel number of the communication target is appended from among the pieces of communication data to each of which a channel number is appended, as well as the transmission control to transmit, to the destination, the communication data to which the channel number of the communication target is appended. However, each of the wireless communication apparatuses does not necessarily have to have both types of control. It is acceptable to configure each of the wireless communication apparatuses so as to have one of the two types of control.

System Configuration and the Like

Of the processes described in the present embodiments, a part or all of the processes that are described as being performed automatically may be performed manually. Conversely, a part or all of the processes that are described as being performed manually may be performed automatically by using a publicly-known method. In addition, unless noted otherwise, it is possible to arbitrarily modify the processing procedures, the control procedures, the specific names presented in the text above and the drawings, such as information including the various types of data and the parameters illustrated in FIGS. 5, 7 and so on.

Further, the constituent elements of the apparatuses depicted in the drawings are based on functional concepts thereof and do not necessarily have to be physically configured in the manner depicted in the drawings. In other words, the specific modes of distributions and integrations of the apparatuses are not limited to those depicted in the drawings (e.g., the data reception processing unit 16 and the data transmission processing unit 18 may be integrated together). It is possible to functionally or physically distribute and integrate a part or all of the constituent elements in any arbitrary units, depending on various loads and the status of use. Further, all or an arbitrary part of the processing functions performed by the apparatuses may be realized by a Central Processing Unit (CPU) and a computer program (hereinafter, "program") that is analyzed and executed by the CPU or may be realized as hardware using wired logic.

Programs

The various types of processes explained in the exemplary embodiments described above may be realized by causing a computer system such as a personal computer or a work station to execute a program prepared in advance. In the following sections, an example of a computer system that executes a program having the same functions as those in the exemplary embodiments described above will be explained.

Figure 17:
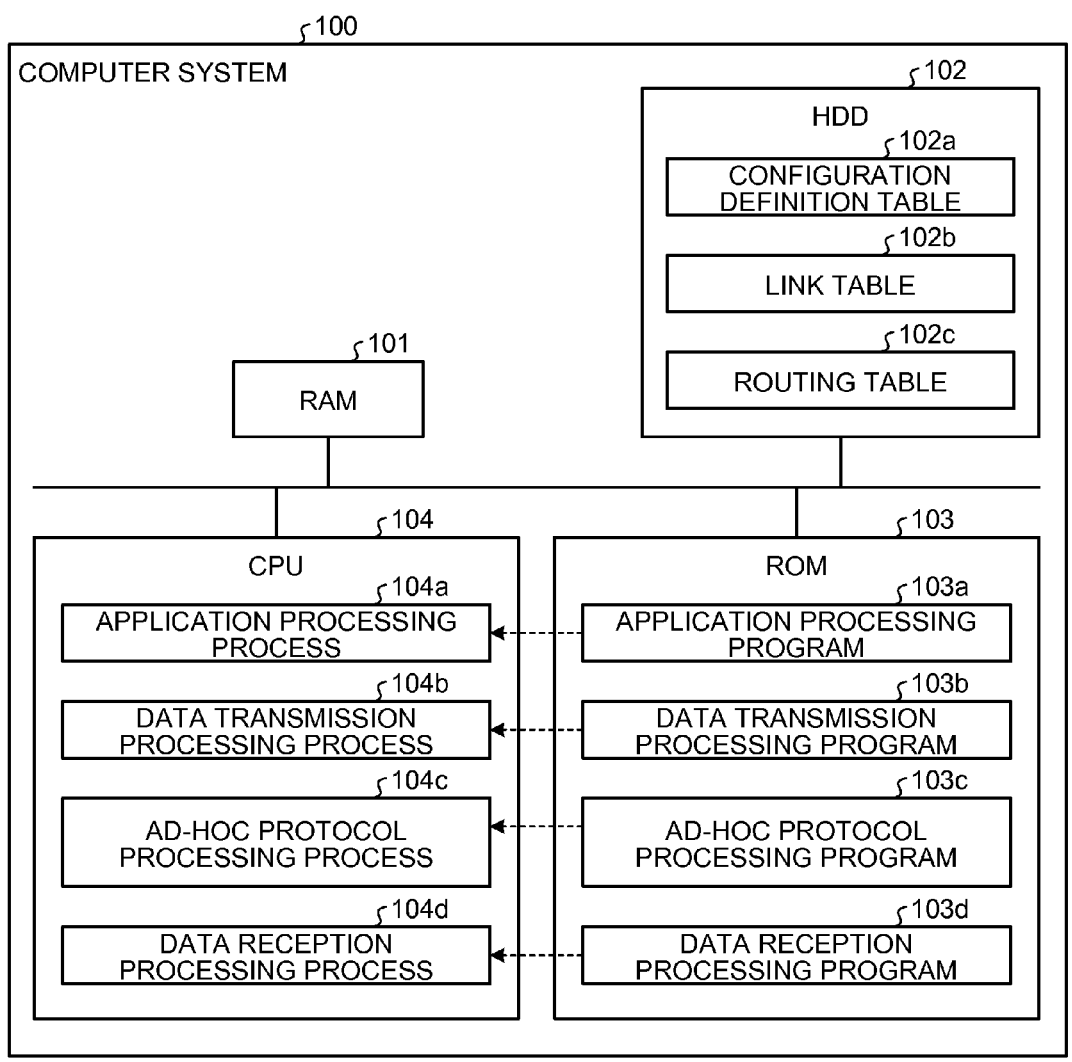
FIG. 17 is an illustration of a computer system 100 that executes a wireless communication computer program.
Figure 18:
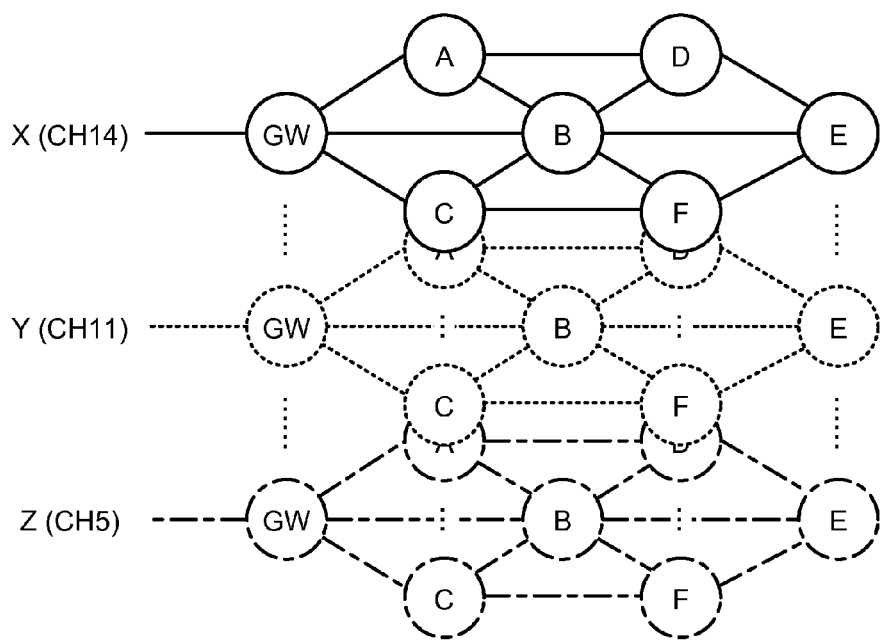
FIG. 18 is an illustration of a conventional ad-hoc network in which a plurality of channels are used.
Figure 19:
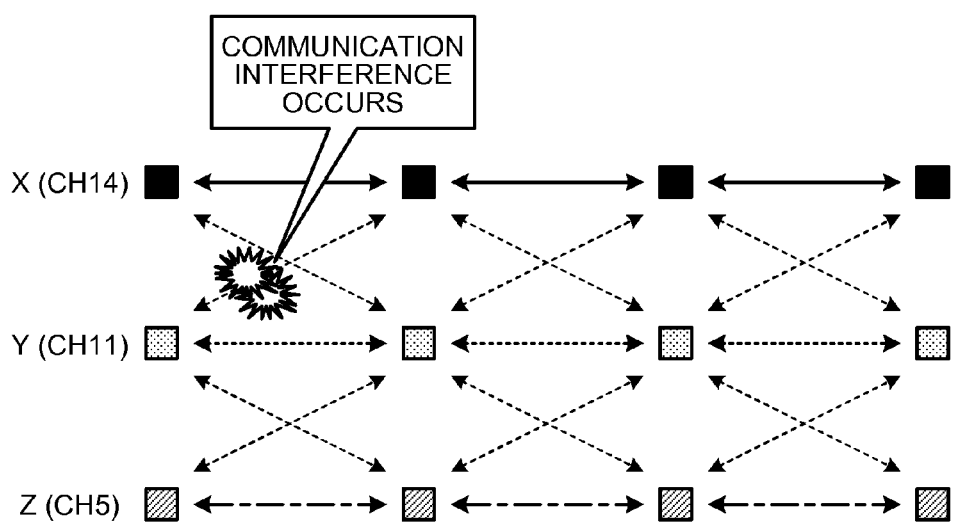
FIG. 19 is an illustration for explaining a situation in which communication interference is occurring.

FIG. 17 is a drawing of a computer system 100 that executes a wireless communication program. As depicted in FIG. 17, the computer system 100 includes a Random Access Memory (RAM) 101, a Hard Disk Drive (HDD) 102, a Read Only Memory (ROM) 103, and a CPU 104. In this situation, the ROM 103 stores therein, in advance, a program that realizes the same functions as those described in the exemplary embodiments above. In other words, as depicted in FIG. 17, the ROM 103 stores therein, in advance, an application processing program 103a, a data transmission processing program 103b, an ad-hoc protocol processing program 103c, and a data reception processing program 103d.

Further, in the CPU 104, when being read and executed, the programs 103a to 103d are realized as processes, as depicted in FIG. 17. In other words, an application processing process 104a, a data transmission processing process 104b, an ad-hoc protocol processing process 104c, and a data reception processing process 104d are realized. The application processing process 104a corresponds to the application processing unit 17 depicted in FIG. 9. Similarly, the data transmission processing process 104b corresponds to the data transmission processing unit 18. Further, the ad-hoc protocol processing process 104c corresponds to the ad-hoc protocol processing unit 15, whereas the data reception processing process 104d corresponds to the data reception processing unit 16.

Further, a configuration definition table 102a, a link table 102b, and a routing table 102c are provided in the HDD 102. The configuration definition table 102a corresponds to the configuration definition DB 12 depicted in FIG. 9. The link table 102b corresponds to the link table 13. The routing table 102c corresponds to the routing table 14.

The programs 103a to 103d described above do not necessarily have to be stored in the ROM 103. For example, it is acceptable to store the programs 103a to 103d into a "portable physical medium" such as a flexible disk (FD), a Compact Disk Read Only Memory (CD-ROM), a Digital Versatile Disk (DVD), a magneto-optical disk, or an Integrated Circuit (IC) card, that can be inserted into the computer system 100. It is also acceptable to store the programs 103a to 103d into a "stationary physical medium" such as a Hard Disk Drive (HDD) provided on the inside or the outside of the computer system 100. Further, it is also acceptable to store the programs 103a to 103d into "another computer system" connected to the computer system 100 via a public communication line, the Internet, a LAN, a Wide Area Network (WAN) or the like. It is acceptable to configure the computer system 100 so as to read and execute the programs from any of the above.

In other words, the programs described in the present modified embodiment are recorded in a computer-readable manner into a recording medium like the "portable physical medium", the "stationary physical medium", and the "communication medium" described above. The computer system 100 then realizes the same functions as those in the exemplary embodiments described above by reading and executing the programs from the recording medium. The programs described in the present modified embodiment do not necessarily have to be executed by the computer system 100. The present invention is similarly applicable to situations where, for example, the programs are executed by another computer system or a server and where the programs are executed by one or more computer systems and one or more servers operating in collaboration.

The wireless communication apparatus and the wireless communication program according to an aspect of the present invention achieve an advantageous effect where it is possible to use the communication service properly even in the ad-hoc network environment where the plurality of channels are usable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a processor; and
a memory, wherein the processor executes:
receiving communication data that is transmitted to the wireless communication apparatus, the communication data including address information of the wireless communication apparatus in destination information, and including any channel number information among a plurality of channel numbers;
obtaining the channel number information included in the communication data;
judging whether the obtained channel number information is channel number information indicating a channel of a communication target; and
performing a receiving process on the communication data when it is determined that the obtained channel number information is channel number information indicating the channel of the communication target at the judging, and discarding the received communication data when it is determined that the obtained channel number information is not channel number information indicating the channel of the communication target at the judging, wherein
the processor further executes transmitting, when a HELLO transmission time has arrived, in the manner of a broadcast, a HELLO message containing node information stored in the wireless communication apparatus, and
the HELLO message contains, in addition to the node information of the wireless communication apparatus, other node information including the node information of a gateway (GW), wherein
the node that has received the HELLO message registers a source node into a routing table and registers information indicating that a path to the gateway is routed through the source node into the routing table and a link table, wherein
the routing table stores therein, as path information to a destination node, a hop number, a path quality weight, and a return path link weight, and
the link table stores therein a local sender address, link quality information, the number of times a HELLO has been received, and a HELLO request interval, received via the HELLO messages.

2. The wireless communication apparatus according to claim 1, wherein the processor further executes, when the communication data received at the receiving contains a change instruction indicating that the channel number information indicating a channel of a communication target is to be changed, changing the channel number information to channel number information indicated in the change instruction.

3. The wireless communication apparatus according to claim 1, wherein
the processor further executes appending a channel number to be used by the communication data to an ad-hoc header within an ad-hoc message frame representing the communication data of an application and transmitting the communication data to a destination, and
judging whether the channel number contained in the ad-hoc header within the ad-hoc message frame representing the received communication data is the channel number that is currently designated as a communication target by the wireless communication apparatus and outputting the judgment result.

4. The wireless communication apparatus according to claim 1, wherein
the receiving includes receiving ad-hoc frame data addressed to the wireless communication apparatus,
the judging includes judging whether a channel number is appended to an ad-hoc header in the ad-hoc frame data, when the channel number is appended, obtaining the channel number out of the ad-hoc header, judging whether the obtained channel number matches the channel number of the communication target, when the channel number obtained out of the ad-hoc header matches the channel number of the communication target, outputting the ad-hoc frame data, and
the discarding includes discarding, when no channel number is appended or when the channel number does not match the channel number of the communication target, the ad-hoc frame data.

5. The wireless communication apparatus according to claim 1, wherein the node that has received the HELLO message further registers results of calculating path quality and link quality of the path.

6. The wireless communication apparatus according to claim 1, wherein the channel number information is included in an ad-hoc header within an ad-hoc message frame.

7. The wireless communication apparatus according to claim 1, wherein the HELLO message is compressed by using a compression algorithm and is transmitted to an adjacent node,
a signature is appended to a payload following an ad-hoc header within a data frame transmitted and received among nodes, and
the transmission and the reception are performed after the payload is encrypted by using a common key.

8. A wireless communication apparatus comprising:
a processor; and
a memory, wherein the processor executes:
transmitting communication data to a destination apparatus by using any channel among a plurality of channels, wherein
the transmitting includes generating the communication data including address information of the destination apparatus in destination information, and including channel number information that is a communication target of the destination apparatus, and transmitting the generated communication data to the destination apparatus, wherein
the processor further executes transmitting, when a HELLO transmission time has arrived, in the manner of a broadcast, a HELLO message containing node information stored in the wireless communication apparatus, and
the HELLO message contains, in addition to the node information of the wireless communication apparatus, other node information including the node information of a gateway (GW), wherein
the node that has received the HELLO message registers a source node into a routing table and registers information indicating that a path to the gateway is routed through the source node into the routing table and a link table, wherein the routing table stores therein, as path information to a destination node, a hop number, a path quality weight, and a return path link weight, and the link table stores therein a local sender address, link quality information, the number of times a HELLO has been received, and a HELLO request interval, received via the HELLO messages.

9. The wireless communication apparatus according to claim 8, wherein the transmitting includes appending, to the communication data, information instructing that the channel number information that is a communication target is to be changed and transmitting the communication data to the destination apparatus.

10. A non-transitory computer-readable storage medium storing a program for processing a wireless communication, the program causing a computer to execute:

receiving communication data that is transmitted to the wireless communication apparatus, the communication data including address information of the wireless communication apparatus in destination information, and including any channel number information among a plurality of channel numbers;

obtaining the channel number information included in the communication data;

judging whether the obtained channel number information is channel number information indicating a channel of a communication target;

performing a receiving process on the communication data when it is determined that the obtained channel number information is channel number information indicating the channel of the communication target at the judging, and discarding the received communication data when it is determined that the obtained channel number information is not channel number information indicating the channel of the communication target at the judging; and transmitting, when a HELLO transmission time has arrived, in the manner of a broadcast, a HELLO message containing node information stored in the wireless communication apparatus, wherein the HELLO message contains, in addition to the node information of the wireless communication apparatus, other node information including the node information of a gateway (GW), wherein the node that has received the HELLO message registers a source node into a routing table and registers information indicating that a path to the gateway is routed through the source node into the routing table and a link table, wherein the routing table stores therein, as path information to a destination node, a hop number, a path quality weight, and a return path link weight, and the link table stores therein a local sender address, link quality information, the number of times a HELLO has been received, and a HELLO request interval, received via the HELLO messages.

11. A non-transitory computer-readable storage medium storing a program for processing a wireless communication, the program causing a computer to execute:

transmitting communication data to a destination apparatus by using any channel among a plurality of channels, wherein the transmitting includes generating the communication data including address information of the destination apparatus in destination information, and including channel number information that is a communication target of the destination apparatus, and transmitting the generated communication data to the destination apparatus, the transmitting includes transmitting, when a HELLO transmission time has arrived, in the manner of a broadcast, a HELLO message containing node information stored in the wireless communication apparatus, and the HELLO message contains, in addition to the node information of the wireless communication apparatus, other node information including the node information of a gateway (GW), wherein the node that has received the HELLO message registers a source node into a routing table and registers information indicating that a path to the gateway is routed through the source node into the routing table and a link table, wherein the routing table stores therein, as path information to a destination node, a hop number, a path quality weight, and a return path link weight, and the link table stores therein a local sender address, link quality information, the number of times a HELLO has been received, and a HELLO request interval, received via the HELLO messages.

12. A wireless communication apparatus comprising:
a processor; and
a memory, wherein the processor executes:
transmitting communication data to a destination apparatus by using any channel among a plurality of channels;
receiving communication data that is transmitted to the wireless communication apparatus, the communication data having been transmitted by using any channel among the plurality of channels, including address information of the wireless communication apparatus in destination information, and including any channel number information among a plurality of channel numbers;
obtaining the channel number information included in the communication data;
judging whether the obtained channel number information is channel number information indicating a channel of a communication target; and
performing a receiving process on the communication data when it is determined that the obtained channel number information is channel number information indicating the channel of the communication target at the judging, and discarding the received communication data when it is determined that the obtained channel number information is not channel number information indicating the channel of the communication target at the judging, wherein the processor further executes transmitting, when a HELLO transmission time has arrived, in the manner of a broadcast, a HELLO message containing node information stored in the wireless communication apparatus, and the HELLO message contains, in addition to the node information of the wireless communication apparatus, other node information including the node information of a gateway (GW) , wherein the node that has received the HELLO message registers a source node into a routing table and registers information indicating that a path to the gateway is routed through the source node into the routing table and a link table, wherein the routing table stores therein, as path information to a destination node, a hop number, a path quality weight, and a return path link weight, and the link table stores therein a local sender address, link quality information, the number of times a HELLO has been received, and a HELLO request interval, received via the HELLO messages.

* * * * *